United States Patent
Kuriyama et al.

(10) Patent No.: US 6,462,250 B1
(45) Date of Patent: Oct. 8, 2002

(54) METHOD FOR DECOMPOSING HALOGENATED ALIPHATIC HYDROCARBON COMPOUNDS HAVING ADSORPTION PROCESS AND APPARATUS FOR DECOMPOSITION HAVING ADSORPTION MEANS

(75) Inventors: Akira Kuriyama; Kinya Kato, both of Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/595,439

(22) Filed: Jun. 16, 2000

(30) Foreign Application Priority Data

Jun. 22, 1999 (JP) .......................................... 11-175651
Dec. 22, 1999 (JP) .......................................... 11-365586

(51) Int. Cl.⁷ ............................................... C02F 1/461
(52) U.S. Cl. ...................... 588/204; 588/210; 588/227; 588/237; 204/157.15; 205/742; 205/746
(58) Field of Search ................................. 588/204, 210, 588/227, 237; 204/157.15; 205/742, 746

(56) References Cited

U.S. PATENT DOCUMENTS

| | | | |
|---|---|---|---|
| 5,282,886 A | 2/1994 | Kobayashi | 95/131 |
| 5,308,507 A | 5/1994 | Robson | 210/748 |
| 5,376,284 A | 12/1994 | Takemura et al. | 210/759 |
| 5,578,193 A | 11/1996 | Aoki et al. | 205/746 |
| 5,582,741 A | 12/1996 | Kenmoku et al. | 210/748 |
| 5,611,642 A | 3/1997 | Wilson | 405/128 |

FOREIGN PATENT DOCUMENTS

| | | |
|---|---|---|
| DE | 44 00 308 | 7/1995 |
| DE | 44 37 812 | 4/1996 |
| JP | 5-290 | 1/1983 |
| JP | 5-292 | 1/1983 |
| JP | 6-261590 | 12/1985 |
| JP | 1-180293 | 7/1989 |
| JP | 3-38297 | 2/1991 |
| JP | 5-291 | 1/1993 |
| JP | 5-68845 | 3/1993 |
| JP | 5-269346 | 10/1993 |
| JP | 5-317716 | 12/1993 |
| JP | 6-31135 | 2/1994 |
| JP | 7-51675 | 2/1995 |
| JP | 7-144137 | 6/1995 |
| JP | 8-24572 | 1/1996 |
| JP | 8-243351 | 9/1996 |

OTHER PUBLICATIONS

No month, H. Seki, "Contaminated Groundwater and Soil: Present Condition and Countermeasures" (Japan Society of Water Environment, Kansai Branch ed. 1995).

Primary Examiner—Arun S. Phasge
(74) Attorney, Agent, or Firm—Fitzpatrick, Cella, Harper & Scinto

(57) ABSTRACT

Process and apparatus for decomposing halogenated aliphatic hydrocarbon compounds in the presence of functional water under light irradiation, where the target substance for decomposition contained at a low concentration in the exhaust or discharge from the decomposition unit is adsorbed by an adsorption unit, and at regular intervals, the adsorbed target substance is released from the adsorption unit and returned to the decomposition unit. The concentration of the target substance in the waste or discharge can be easily and efficiently reduced below the environmental standard.

56 Claims, 7 Drawing Sheets

METHOD FOR DECOMPOSING HALOGENATED ALIPHATIC HYDROCARBON COMPOUNDS HAVING ADSORPTION PROCESS AND APPARATUS FOR DECOMPOSITION HAVING ADSORPTION MEANS

BACKGROUND OF THE INVENTION

Field of the Invention

This invention relates to a method of decomposing halogenated aliphatic hydrocarbon compounds and also to an apparatus to be used for such a method.

Related Background Art

With developing industries, a large amount of organic compounds, such as halogenated aliphatic hydrocarbon compounds, have been used, and the disposal of such compounds has become a serious problem. In particular, spent halogenated aliphatic hydrocarbon compounds are causing great concern over environmental pollution. Extensive efforts have been made to solve this problem.

For example, chlorinated aliphatic hydrocarbon, compounds such as trichloroethylene (TCE) and tetrachloroethylene (PCE), belong to halogenated aliphatic hydrocarbons, which have been abundantly used in various industries as cleansing solvents for metal parts, semiconductor parts and textiles and also as reaction solvents.

However, as their toxicity, such as mutagenicity and carcinogenicity, has been pointed out, complete prohibition of their use and treatment to make the spent solvents harmless have been required. Additionally, the compounds already released into the natural environment are contaminating river water, ground water and soil. Therefore, development of new technologies for economical and efficient removal of the contaminants from the environment are in great need, and a variety of new technologies have been proposed for such applications.

For example, a combustion process has been proposed to decompose chlorinated aliphatic hydrocarbon compounds. Although this process is relatively simple, there is a new concern that decomposition products of chlorinated aliphatic hydrocarbons, i.e., hydrogen chloride and chlorine, would react with other organic compounds during the combustion process to produce more toxic substances, such as polybiphenyl chloride and dioxin. Additionally, the high temperature treatment is a drawback in view of energy consumption.

Also, techniques of using an oxidizing agent or a catalyst for decomposing chlorinated aliphatic hydrocarbon compounds have been proposed. Specific examples include a process of decomposing harmful hydrocarbons using ozone (Japanese Patent Application Laid-Open No. 3-38297), a process of wet oxidation decomposition at high temperature under high pressure and a process of oxidization decomposition with hydrogen peroxide or a salt of iron (Japanese Patent Application Laid-Open No. 60-261590).

There is also proposed a process of using sodium hypochlorite as an oxidizing agent (U.S. Pat. No. 5,611, 642), or a combined use of sodium hypochlorite and UV irradiation (U.S. Pat. No. 5,582,741). A process is also proposed in which a suspension of a photocatalyst (fine particles of an oxide semiconductor such as titanium oxide) in liquid chlorinated aliphatic hydrocarbons is prepared under alkaline conditions to decompose the hydrocarbons by light irradiation (Japanese Patent Application Laid-Open No. 7-144137). A catalytic oxidation degradation process using an oxide, such as platinum oxide, alumina and zirconium oxide, is also proposed (H. Ichimura et al., Japanese Patent Application Laid-Open No. 6-31135).

Also, there has been tried a photolysis process in which chlorinated aliphatic hydrocarbon compounds are decomposed by irradiation with UV light in a gaseous phase without using an oxidizing agent (H. Seki et al, "Contaminated Groundwater and Soil: Present Condition and Countermeasure", ed. by Kansai Branch of Japan Water Environment Society and Environmental Technology Research Institute, 1995; Japanese Patent Application Laid-Open No. 8-243351).

It is known that chlorinated aliphatic hydrocarbons such as TCE and PCE are decomposed by microorganisms aerobically or anaerobically, and there have been attempts to decompose such compounds and purify the natural environment by such a microbial process.

In Japanese Patent Application Laid-Open Nos. 5-269346 and 5-068845, there are disclosed methods for removing compounds of low boiling points by using adsorbents, such as activated carbon and zeolite. These methods do not mention how to treat the adsorbed contaminants. Japanese Patent Application Laid-Open No. 8-24572 discloses a decomposing method where a contaminant once adsorbed on activated carbon is released by heating it and then decomposed; the methyl bromide-containing gas exhausted from a fumigation warehouse is adsorbed by activated carbon and then methyl bromide released from the activated carbon by heating is subjected to thermal decomposition in the presence of a catalyst, such as alumina, titania, and zirconia. Japanese Patent Application Laid-Open Nos. 5-290, 5-291 and 5-292 disclose methods of degrading organochlorine compounds adsorbed by porous iron material, where hydrogen peroxide is added to a waste water containing organochlorine compounds, such as trichloroethylene, and the waste water is circulated and aerated in a treatment apparatus provided with an iron porous material to carry out adsorption-oxidative decomposition of the compounds.

Further, Japanese Patent Application Laid-Open No. 5-317716 discloses a method for treating waste water with a porous catalyst, where a porous material is prepared by sintering iron oxide with at least one element selected from cobalt, nickel cerium, silver, gold, platinum, palladium, rhodium, lutenium and iridium, and, using the porous material as a catalyst, wet oxidation of nitrogen-containing or sulfur-containing or organohalogen compounds adsorbed by the porous material is carried out.

SUMMARY OF THE INVENTION

As listed above, a number of methods for decomposing halogenated aliphatic hydrocarbon compounds have been proposed to date. However, the present inventors have found or predicted problems that most of these methods require complicated apparatuses for decomposition, and/or a further process to make the decomposition products harmless. Thus, there is still a strong demand for eco-friendly technology for decomposing halogenated aliphatic hydrocarbon compounds.

The present invention was made based on the inventors' new finding, and the object of the present invention is to provide a method of efficiently decomposing halogenated aliphatic hydrocarbon compounds in an eco-friendly manner with a lower possibility of producing decomposition products that will cause secondary environmental contamination, as well as an apparatus to be used for such a method.

In a study for achieving the above objects, the present inventors found that functional water obtainable by electrolysis of water, e.g., acidic water, a sterilizing effect (Japanese Patent Application Laid-Open No. 1-180293) and cleansing effect of which on the surface of semiconductor wafers (Japanese Patent Application Laid-Open No. 7-51675) have been reported, can remarkably accelerate the decomposition of halogenated aliphatic hydrocarbon compounds under light irradiation.

The decomposition speed of halogenated aliphatic hydrocarbon compounds by light-irradiated functional water is very high, but the decomposition efficiency will decrease as the concentration of the compound to be degraded falls, so long as the decomposition reaction is a chemical reaction.

The inventors of the present invention have noted that the time necessary for the reduction of the residual contaminant concentration by one order, for example, from 99% to 99.9% or from 99.9% to 99.99%, would not differ much. They have found that when the decomposition reaction in the decomposition apparatus is stopped at an appropriate stage and the contaminant is adsorbed to reduce the contaminant level in the exhaust gas or waste water to the exhaust standard or lower, and then the adsorbed contaminant is released and returned to the decomposition apparatus, a higher decomposition efficiency can be maintained than when the residual concentration of the contaminant is reduced at a stretch to the exhaust quality standard level or lower, which takes a long time.

Thus, according to an aspect of the present invention, there is provided a method of decomposing a target substance being a halogenated aliphatic hydrocarbon compound with functional water, comprising the steps of:

- contacting the target compound and an active component of the functional water for decomposition in a closed reaction chamber wherein the active component is generated in the functional water by light irradiation;
- removing the target compound remained intact in the reaction chamber;
- adsorbing the removed target by using an adsorbent;
- releasing the adsorbed target substance from the adsorbent; and
- feeding back the released target substance to the reaction chamber.

According to another aspect of the present invention, there is provided an apparatus for decomposing a halogenated aliphatic hydrocarbon compound comprising:

- a reaction chamber in a tightly closed state;
- means to supply a target substance being a halogenated aliphatic hydrocarbon compound to the reaction chamber;
- means to supply a functional water to the reaction chamber;
- means for irradiating light to generate an active component for decomposition in the functional water;
- means for removing the target substance remained intact in the reaction chamber from the reaction chamber;
- means for adsorbing the removed target substance with an adsorbent;
- means for releasing the adsorbed target material from the adsorbent; and
- means for feeding back the released target substance to the reaction chamber.

According to the present invention of the process and apparatus for decomposing halogenated aliphatic hydrocarbon compounds, where the target substance for decomposition contained at a low concentration in the exhaust or discharge from the decomposition unit is adsorbed by an adsorption unit, and at regular intervals, the adsorbed target substance is released from the adsorption unit and returned to the decomposition unit, the concentration of the target substance in the waste or discharge can be easily reduced to the environmental standard or lower, avoiding poor running efficiency such as enlarging the size of the decomposition vessel, elongating the residence time, or connecting similar apparatuses in tandem.

DETAILED DESCRIPTION OF THE PREFERRED EMBODIMENTS

Functional Water—Acidic Electrolyzed Water

Figure 1:
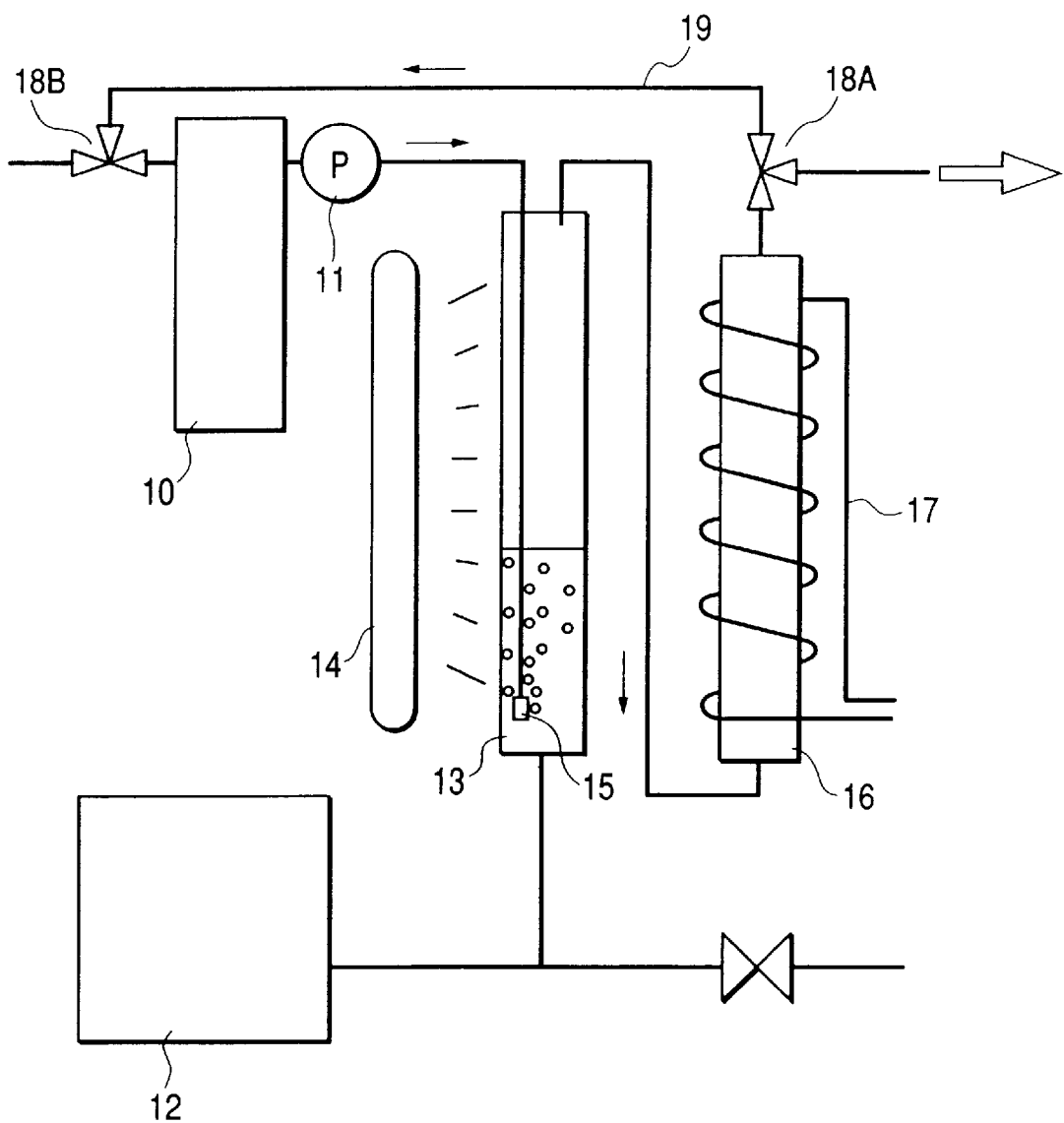
FIG. 1 is a schematic diagram of an embodiment of an apparatus for decomposing halogenated aliphatic hydrocarbon compounds according to the invention.

Functional water can be obtained near the anode when one or more electrolytes (e.g. sodium chloride and potassium chloride) are dissolved into the source water and the solution is subjected to electrolysis in a water tank provided with a pair of electrodes. Functional water as used herein refers to a water showing a hydrogen ion concentration (pH value) between 1 and 4, an oxidation-reduction potential between 800 mV and 1,500 mV when measured by using platinum and silver-silver chloride as the working and the reference electrodes respectively, and a chlorine concentration between 5 mg/liter and 150 mg/liter.

For preparing functional water having the above characteristic properties, the concentration of the electrolyte, for example, sodium chloride, in the source water prior to electrolysis is preferably between 20 mg/l and 2,000 mg/l and the electrolytic current is preferably between 2A and 20A. To obtain such functional water, any commercially available strongly acidic electrolyzed water generator (e.g., OASYS Bio HALF: trade name, a product of Asahi Glass Engineering, or Strong Electrolyzed Water Generator Model FW-200: trade name, a product of Amano) may be used.

Undesired mixing of the acidic water produced around the anode and the alkaline water produced around the cathode can be prevented by providing a diaphragm between the paired electrodes, to effectively obtain acidic water that can efficiently decompose the halogenated aliphatic hydrocarbon compounds or the aromatic compounds. Such a diaphragm may suitably be an ion exchange membrane.

Functional Water—Mixed Electrolyzed Water

The functional water has a chlorine concentration between 2 mg/l and 100 mg/l, a pH value between 4 and 10, and an oxidation-reduction potential between 300 mV and 1,100 mV when measured by using platinum and silver-silver chloride as the working and the reference electrodes respectively. Such functional water may be obtained by mixing one volume of the acidic water with less than one volume of the alkaline water obtained around the cathode during electrolysis to obtain acidic electrolyzed water.

Synthetic Functional Water

Functional water can be also prepared by dissolving one or more agents into source water in place of electrolysis, which is as effective as functional water prepared by electrolysis in decomposing halogenated aliphatic hydrocarbon compounds. For example, such synthetic functional water contains 0.001 to 0.1 mol/l of hydrochloric acid (calculated from 0.001 to 0.1 N), 0.005 to 0.02 mol/l of sodium chloride (calculated from 0.005 to 0.02 N) and 0.0001 to 0:01 mol/l of sodium hypochlorite.

Also, functional water showing a chlorine concentration between 2 mg/l and 100 mg/l, a pH value between 4 and 10, and an oxidation-reduction potential between 300 mV and 1,100 mV when measured by using platinum and silver-silver chloride as the working and the reference electrodes respectively may be prepared by dissolving one or more agents instead of by electrolysis. For example, such synthetic functional water contain 0.001 to 0.1 mol/l of hydrochloric acid (calculated from 0.001 to 0.1 N), 0.001 to 0.1 mol/l of sodium hydroxide (calculated from 0.001 to 0.1 N) and 0.0001 to 0.01 mol/l sodium hypochlorite. Addition of hypochlorite only, for example sodium hypochlorite at a concentration between 0.0001 mol/l and 0.1 mol/l, may produce functional water. Functional water with a pH value not higher than 4.0 and a chloride concentration not lower than 2 mg/l may be prepared by using hydrochloric acid and hypochlorite.

Hydrochloric acid may be replaced by some other inorganic acid or by an organic acid. Inorganic acids that can be used for the purpose of the invention include hydrofluoric acid, sulfuric acid, phosphoric acid and boric acid, whereas organic acids that can be used for the purpose of the invention include acetic acid, formic acid, malic acid, citric acid and oxalic acid. A commercially available weak acidic water generating powder (e.g., Kino-san 21X: trade name, a product of Clean Chemical) typically containing $N_3C_3O_3NaCl_2$ may also be used for preparing functional water.

As seen in the Examples, functional water prepared by using such agents is able to decompose halogenated aliphatic hydrocarbon compounds under light irradiation, as is the functional water prepared by electrolysis, although the capability may vary in efficiency. Source water as used herein refers to tap water, river water or sea water. Such water typically shows a pH value between 6 and 8 and a chlorine concentration of less than 1 mg/l at most and hence is not able to decompose halogenated aliphatic hydrocarbon compounds.

Halogenated Aliphatic Hydrocarbon Compounds to be Decomposed

Halogenated aliphatic hydrocarbon compounds to be decomposed (hereinafter referred to as target substance) by a method according to the invention are halogen substituted aliphatic hydrocarbon compounds. Specific examples of such chlorine-substituted products include trichloromethane, dichloromethane, 1,1- dichloroethylene, cis-1,2-dichloroethylene, trans-1,2-dichloroethylene, trichloroethylene, tetrachloroethylene, and 1,1,1-trichloroethane.

After the decomposition of any of the above listed compounds, no generation of environmentally harmful products can be observed in the functional water by mass spectrum.

It should be noted that in the present invention the "residual compounds to be decomposed" means not only the compounds remaining undecomposed but also intermediate decomposition products from which chlorine atoms are not yet removed (this is the final goal of this invention). On the other hand, although final decomposition products are water and carbon dioxide, organic acids, such as lower carboxylic acids that have already lost chlorine atoms, which are useful for pH control, can be included in the decomposition products.

Light Source

Irradiation light for decomposing target compounds in functional water preferably has a wavelength between 300 and 500 nm, more preferably between 350 and 450 nm.

From the viewpoint of decomposition efficiency, the intensity of irradiation to a mixture of functional water and the target substance is preferably between 10 $\mu W/cm^2$ and 10 $mW/cm^2$, more preferably between 50 $\mu W/cm^2$ and 5 $mW/cm^2$. For example, light from a light source with a peak wavelength of 365 nm and an intensity of several hundreds $\mu W/cm^2$ (as measured in a wavelength range between 300 nm and 400 nm) is sufficient for decomposing the target substance in practical applications.

Either natural light (e.g., sun light) or artificial light (from a mercury lamp, a black lamp or a color fluorescent lamp) can be used for the purpose of the invention.

A mixture of functional water and a target substance can be irradiated either directly or through a transparent container typically made of glass or a plastic material. Functional water can be irradiated after or during the production process thereof.

In order to greatly accelerate the decomposition, irradiation is desirably carried out while the target substance is in contact with the functional water and/or the gas generated from the functional water. In the embodiments of the present invention using functional water, it is not necessary to use beams that may adversely affect the human body (e.g., UV light of a wavelength of 250 nm).

Action of Functional Water and its Suitable Concentration

The decomposition is promoted when any one of the above listed different types of functional water is irradiated with light. Functional water produced by electrolysis of water containing electrolytes such as sodium chloride contains hypochlorous acid or hypochlorite ions, which probably induce generation of chlorine radicals, hydroxyl radicals and/or superoxides to promote the decomposition reaction of the target substance.

The quantity of hypochlorous acid in the functional water, which is generated by electrolysis around the anode and thought to be participating in the decomposition process of the target substance, can be determined by the pH and the chlorine concentration. Additionally, functional water generated by electrolysis and diluted with pure water can be used for decomposing the target substance.

For example, TCE-contaminated water (up to about 10 ppm) can be purified to less than 0.03 ppm within four hours using a five-hold or more dilution with water of functional water of an oxidation-reduction potential of 1,150 mV and a residual chlorine concentration of 54 mg/l.

Alternatively, functional water having the same characteristics as a diluted functional water may be prepared directly.

Absorbent

Any material can be used, so long as this material can adsorb the target substance and release it as needed. As such materials, porous materials having vast adsorption surface area are generally used. For example, the materials are activated carbon and activated carbon fiber, which are made by carbonizing chitinous materials or cellulose materials, such as wood; porous metals made by sintering fine powder of zeolite, iron or alumina; activated clay often used as an oil adsorbent or a deodorant.

Activated carbon, which is one of the most commonly used adsorbent that has a specific surface area or area/weight ratio of 300 to 3000 $m^2/g$ and a pore size of 30 to 300 angstroms, can adsorb gaseous TCE as much as ten-fold of its own weight. According to the experiment carried out by the present inventors, a solution of TCE can be cleared to a level of 0.03 mg/l or less to satisfy the environmental standards by adding activated carbon in the amount that is about 400 times as much as the amount of TCE in the solution. The inventors also found that activated carbon adsorbs almost the same amount of TCE whether TCE is the only solute in an aqueous solution, or both TCE and TCE degradation products that are contained in the solution after the TCE degradation treatment.

Thus, by calculation, when a solution containing several mg/l TCE is passed through a pipe containing about 10 g of fresh activated carbon at 10 ml/min for several hundreds hours, the TCE concentration of the eluate is maintained within the environmental quality standards. Nowadays, various activated carbon fibers have been developed, and activated carbon sheets made from such a fiber, which is processed into textile or unwoven fabric or even into cartridges, are available. The apparatus may contain activated carbon of such a type.

The target substance adsorbed by the above-mentioned adsorbent can be easily released and recovered from the adsorbent by heating it to a high temperature or placing it under a reduced pressure. As the heating methods, there are such methods as, for example, heating the vessel of the adsorbent, bringing the adsorbent itself into contact with a high temperature medium, such as steam, irradiating with microwaves, and direct application of electric current.

Selection of the adsorbent depends on the conditions of the target substance. For example, activated carbon can be used for adsorbing the target substance contained in gas or in a liquid. On the other hand, one can expect a higher adsorbing capability from zeolite than activated carbon, but zeolite has a higher activity in water and cannot be used to adsorb a target substance contained in water.

Method and Apparatus

Next, methods and apparatuses to be used for decomposing the target substance by using functional water according to the invention will be described. In the embodiment of the present invention, the contact between functional water and the target substance and irradiation are sufficiently carried out at ordinary temperature and pressure, so that special facility and/or environment is not necessary.

For example, it will be sufficient for the purpose of the invention that the target substance is directly introduced into a tightly sealed vessel containing functional water, followed by irradiation with light. Alternatively, the target substance is introduced into a tightly sealed water tank where functional water is generated under irradiation. Here, "tightly sealed" means pipes connecting the vessel to other units are closed with valves etc., so that gas or liquid will not leak outside.

For the purpose of the invention, the apparatus for decomposing the target substance can be one of following constitutions 1) to 3).

Constitution 1: A gaseous target substance and an electrolyzed or synthesized functional water are introduced into a decomposition unit and irradiated with light, and the treated gas is discharged outside after passing through the adsorption unit for complete removal of the target substance.

FIG. 1 is a schematic block diagram of an embodiment of the apparatus for decomposing the target substance according to the invention. In FIG. 1, reference numeral 13 denotes a decomposition vessel made of a light transmitting material, in which the target substance comes into contact with the active components contained in the functional water, in gas phase or liquid phase, and decomposed under light irradiation. Functional water produced in a functional water-providing unit 12 is supplied continuously to the decomposition vessel 13. Alternatively, the decomposition vessel 13 may be provided with electrodes, and functional water is generated in the vessel 13 by supplying an electrolyte from the functional water-providing unit 12, and by applying a voltage to the electrodes. Thus, the vessel 13 can serve for both generating functional water and decomposing the target substance.

The gas containing a target substance may be supplied to the decomposition vessel 13 through a bubbler 15 in the vessel 13 from a contaminated gas supplying unit 10 by using a pump 11, while the inside of the vessel 13 is irradiated by means of a light irradiation unit 14. The gas containing a target substance may be jetted out into the functional water in the decomposition vessel 13 through a bubbler 15 from a contaminated gas supplying unit 10 by using a pump 11 to aerate the functional water. This aeration generates a gaseous mixture of the gas containing the target substance and a gas generated from the functional water, and the mixture is subjected to light irradiation by means of a light irradiation unit 14. The treated gas is further treated in an adsorption unit 16 provided with a heating means 17 (e.g., heating wire or heat pipe), and then discharged from a diverter valve 18(A) after the removal of the residual target substance. The heating means 17 may be an electric heater wire, or a hot water pipe, and may be wound around or imbedded in the unit 16.

At regular intervals, the target substance not decomposed in the decomposition vessel 13 and concentrated by adsorption in the adsorption unit 16 is released from the adsorption unit 16 by switching the diverter valve 18(A,B) and heating the unit 16 by the heating means 17. The released target substance is returned to the contaminated gas supplying means 10 through a recycling pipe 19 to be mixed with new polluted gas, and is fed into the decomposition vessel 13 for a further decomposition treatment.

As an alternative constitution, means 17 to 19 may be omitted and the adsorption unit 16 is periodically removed and the adsorbed target substance in the removed unit 16 is released and introduced into the polluted gas supplying unit 10.

Constitution 2: The undiluted liquid target substance (hereinafter referred to as liquid target substance) or a liquid containing the target substance, and an electrolyzed or synthesized functional water are introduced into a decomposition unit and irradiated with light, and the treated liquid is discharged outside after passing through the adsorption unit for complete removal of the target substance.

Figure 2:
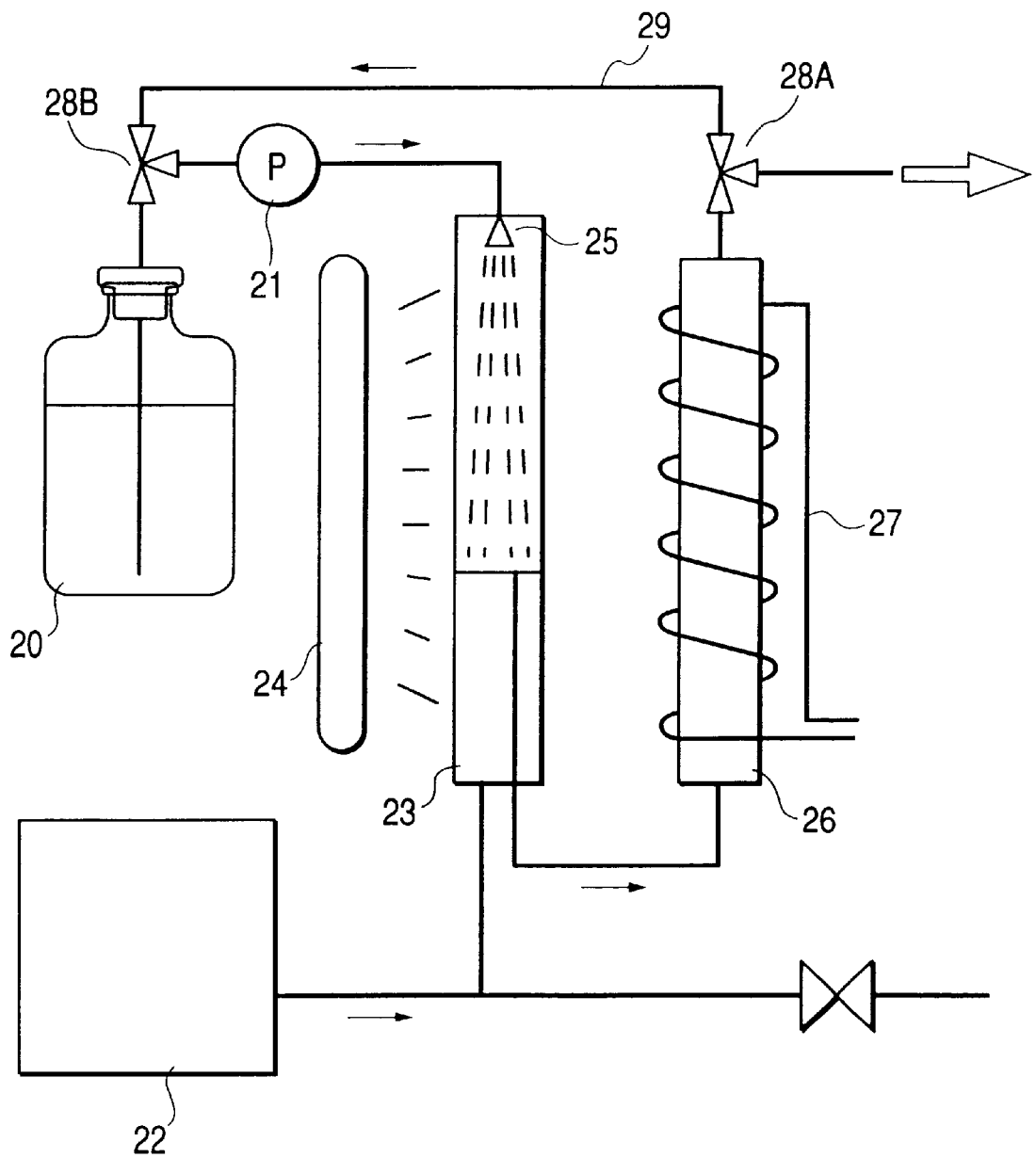
FIG. 2 is a schematic diagram of another embodiment of an apparatus for decomposing halogenated aliphatic hydrocarbon compounds according to the invention.

FIG. 2 is a schematic block diagram of an embodiment of the apparatus for decomposing the target substance according to the invention. In FIG. 2, reference numeral 23 denotes a decomposition vessel made of a light-transmitting material, where the target substance comes into contact with the functional water in a gas phase or liquid phase, and is decomposed under light irradiation.

Functional water produced in a functional water-providing unit 22 is continuously supplied to the treatment vessel 23. Alternatively, the decomposition vessel 23 may be provided with a pair of electrodes and an electrolyte-supplying unit to serve as a vessel where functional water is generated and the target substance is decomposed.

Water containing a target substance fed from a polluted gas supplying unit 20 is sprayed in the decomposition vessel 23 by using a pump 21 through a nozzle 25 set in the vessel 23, while the inside of the vessel 23 is irradiated by means of a light irradiation unit 24. The treated water is further treated in an adsorption unit 26 provided with a heating means 27, and then discharged from a diverter valves 28(A) after the complete removal of the residual target substance. The heating means 27 may be a wire electric heater, or a hot water pipe, and may be wound around or imbedded in the unit 26.

At regular intervals, the target substance not decomposed in the decomposition vessel 23 and concentrated in the adsorption unit 26 is released from the adsorption unit 26 by switching the diverter valves 28(A,B) and heating the unit 26 by the heating means 27. The released target substance is returned to the polluted water supplying means 20 through a recycling pipe 29 to be mixed with new polluted water and fed to the decomposition vessel 23 for further decomposition treatment for efficient decomposition.

As an alternative constitution, means 27 to 29 may be omitted and the adsorption unit 26 is periodically removed and the adsorbed target substance in the removed unit 26 is released and introduced into the polluted gas supplying unit 20.

Constitution 3: A liquid target substance or a liquid containing the target substance and an electrolyzed or synthesized functional water are introduced into a decomposition unit and irradiated with light, and the treated liquid is aerated to vaporize the target substance, which is then removed by the adsorption unit. Then, the treated liquid is discharged outside in a state containing no target substance.

Figure 6:
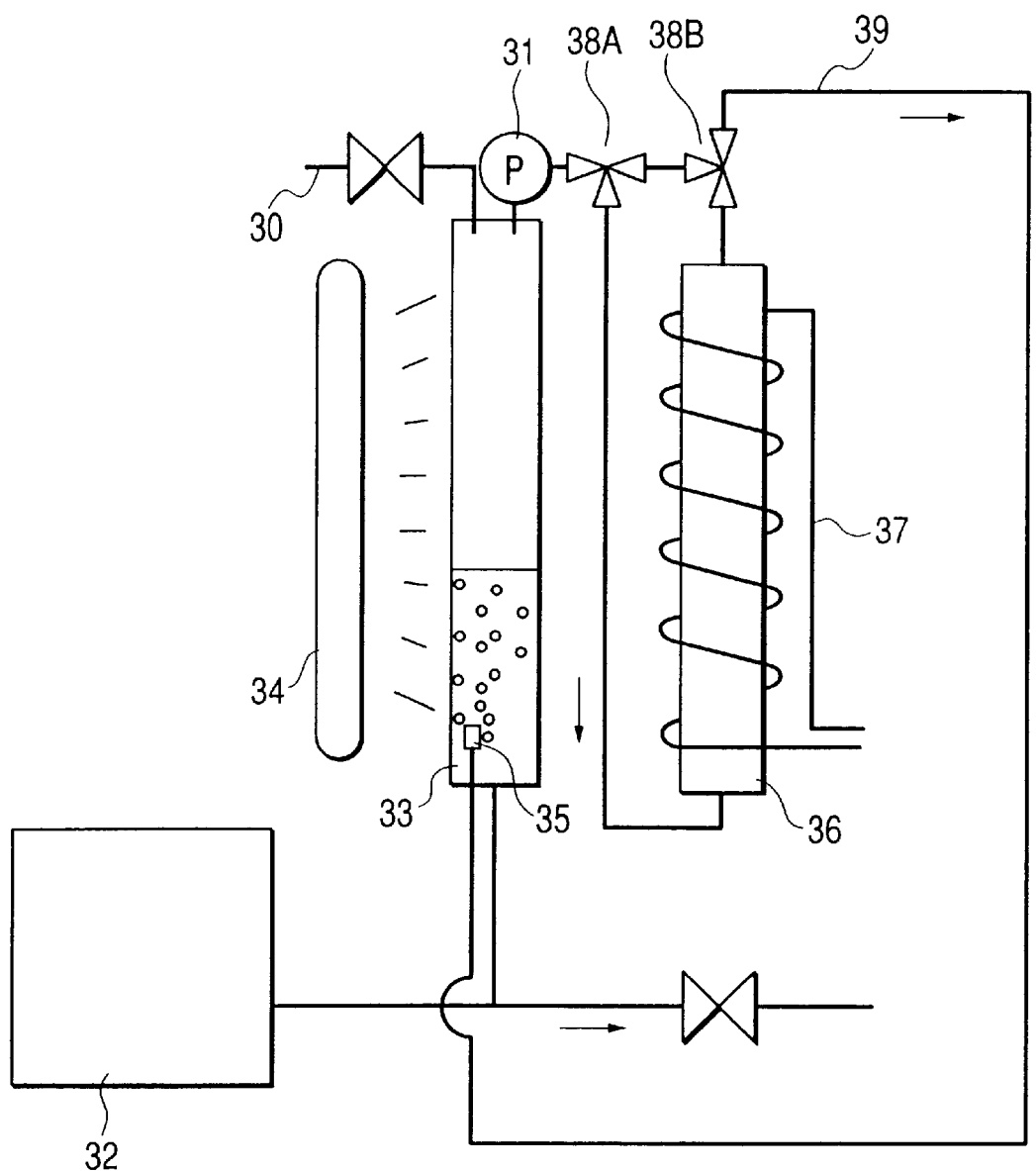
FIG. 6 is a schematic diagram of another embodiment of an apparatus for decomposing halogenated aliphatic hydrocarbon compounds according to the invention.

FIG. 6 is a schematic block diagram of an embodiment of the apparatus for decomposing the target substance according to the invention. In FIG. 6, reference numeral 33 denotes a decomposition treatment vessel made of a light-transmitting material, where the target substance comes into contact with functional water in gas phase and/or liquid phase and is decomposed under light irradiation.

Functional water produced in a functional water-providing unit 32 may be continuously supplied to the treatment vessel 33. Alternatively, the decomposition treatment vessel 33 may be provided with a pair of electrodes (not shown). Thus, the vessel 33 serves as a vessel for functional water generation on application of voltage to the electrodes, as well as a vessel for target substance decomposition.

A liquid target substance or a liquid containing the target substance may be introduced into the decomposition treatment vessel 33 through a port 30, from a polluted gas supplying unit 30, while the inside of the vessel 33 is irradiated by means of a light irradiation unit 34 located at a side of the vessel 33. At that time, with shutting the route to the adsorption unit 36 by switching diverter valves 38(A,B), a gas circulating pump 31 is run to circulate the gas in the upper space of the vessel 33 through a bubbler 35 provided at the bottom of the vessel 33. This enables high decomposition efficiency.

The treated water is further aerated and then the diverter valves 38(A,B) are switched to introduce the gas containing the target substance into an adsorption unit 36 provided with a heating means 37. The heating means 37 may be a wire electric heater, or a hot water pipe, and may be wound around or imbedded in the unit 36. After a certain period of aeration-adsorption for complete removal of residual target substance, the water is discharged. This batch-wise decomposition treatment is repeated. Alternatively, it may be a continuous constitution where the target substance and/or functional water is continuously supplied to the decomposition vessel 33 and the discharged water from the vessel 33 is introduced into an aeration vessel (not shown) where the discharged water is subjected to the aeration treatment to remove the residual target substance.

The target substance not decomposed in the decomposition vessel 33, vaporized by aeration and concentrated by adsorption in the adsorption unit 36, is then released from the adsorption unit 36 by switching the diverter valves 38 (A,B) and heating the unit 36 by the heating means 37 at regular intervals. The released target substance is returned to the decomposition vessel 33 via a recycling pipe 39 for a further decomposition treatment to achieve efficient decomposition.

As an alternative constitution, means 37 to 39 may be omitted and the adsorption unit 36 is periodically changed with a new one, and the adsorbed target substance in the unit 36 is separately released and introduced into the decomposition vessel 33 from a port 30.

Now, the present invention will be described on the basis of each embodiment illustrated in the drawings.

EXAMPLE 1

Batch Decomposition of Trichloroethylene with Functional Electrolyzed Water

In this Example, batchwise TCE decomposition experiment was carried out in a glass bottle containing TCE and functional water, and connected to an activated carbon column.

To begin, functional water was prepared using a strongly acidic functional water generating unit (Strong Electrolyzed Water Generator (Model FW-200): trade name, a product of Amano Co. Ltd.) having a diaphragm arranged between the anode and the cathode. Using this apparatus, water of various electrolyte concentrations and various electrolysis periods, acidic functional water was prepared at the anode side. The pH value and the oxidation-reduction potential of this water were determined by using a pH meter TCX-90i and KP900-2N (Trade name, a product of Toko Chemical Laboratories) and an electroconductivity meter TCX-90i and KM900-2N (Trade name, a product of Toko Chemical Laboratories) respectively, as well as the chlorine concentration of by a chlorine test paper (Advantec). As a result, the pH value varied between 1.0 to 4.0, oxidation-reduction potential of the functional water was 800 to 1,500 mV, and the chlorine concentration was between 5 and 150 mg/l, depending on the electrolytic current, electrolytic time, and electrolyte (sodium chloride) concentration (standard value: 1000 mg/l). In Example 1, a functional water of pH 2.6, redox potential of 1000 mV, residual chlorine concentration of 75 mg/l was prepared to use in a decomposition experiment of TCE. A mixture of 550 ml of the functional water and 700 µl (approx. 1 g) of liquid TCE was fully mixed, completely dissolved by stirring, and placed in a 5.5 liter glass bottle. The bottle had an exhaust port with a stopcock to which a column of activated carbon had been connected. Then, the content of the bottle was stirred by a magnetic stirrer and irradiated with light from a black light fluorescent lamp (10 W, trade name: FL10BLB, a product of Toshiba) set aside the bottle, during which the stopcock was in a closed state, and the intensity of irradiation was 0.1 to 0.4 mW/cm$^2$.

After decomposition was carried out for 15 min, the decomposition was stopped by switching off the light for 5 min, and the exhaust cock was opened and the liquid in the bottle was aerated for 3 min to expel TCE in the bottle to be adsorbed by the activated carbon. Confirming the absence of residual TCE in the bottle, another 500 ml of functional water containing dissolved 700 µl of liquid TCE was introduced into the bottle within about 2 min, and the above process was repeated. The process was repeated 4 times, for 80 min in total.

Figure 3:
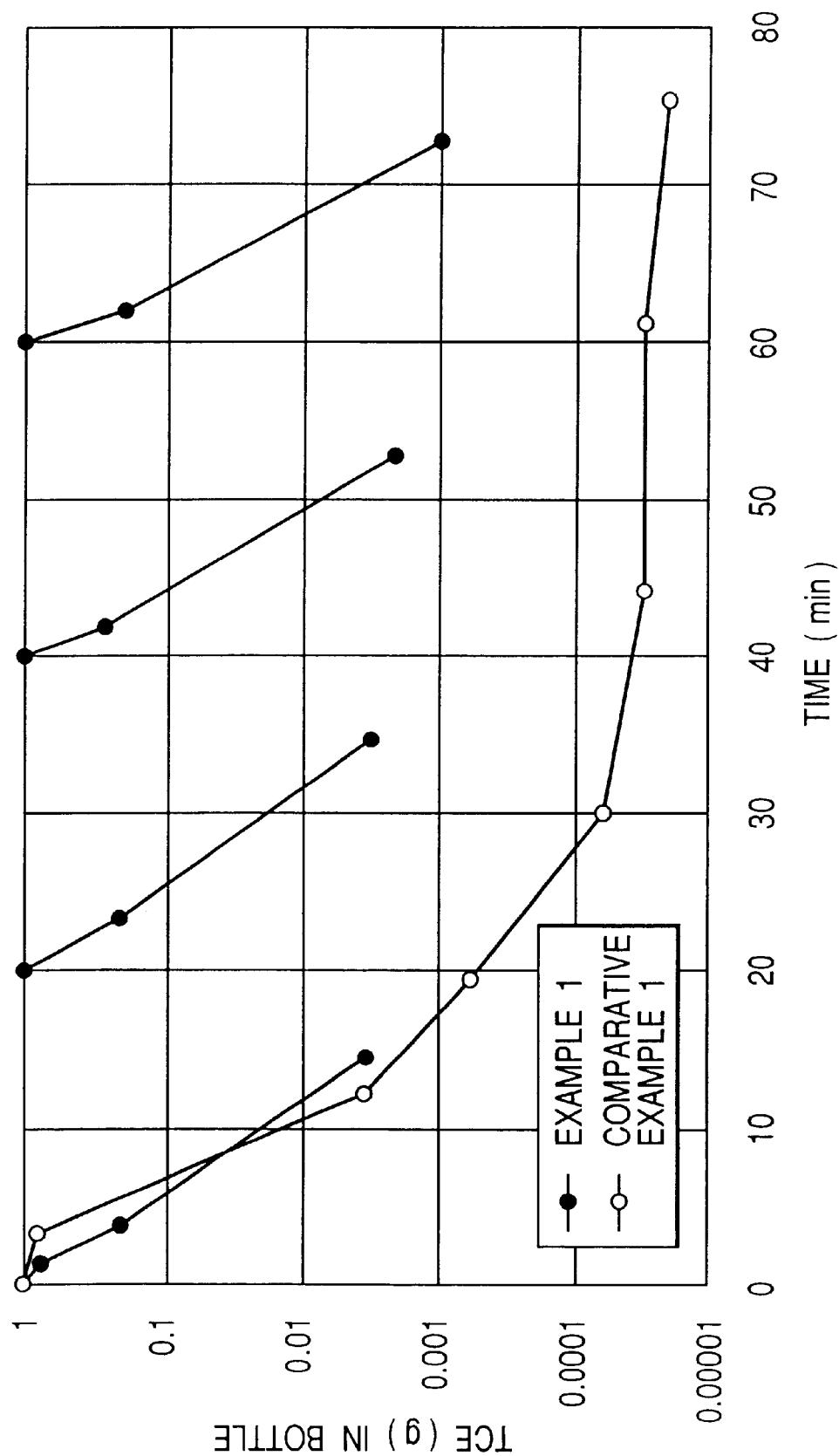
FIG. 3 is a graph showing a change of TCE concentration in glass bottles for decomposition in Example 1 and Comparative Example 1, determined at regular intervals. In Example 1, decomposition and adsorption treatment were intermittently repeated with replenishment of the target substance. In Comparative Example 1, decomposition was conducted in one span until the complete decomposition was achieved.

Periodically, the gas phase TCE in the bottle was sampled by using a gas tight syringe, and analyzed by gas chromatography (GC-14B: trade name, a product of Shimadzu Seisakusho with an FID detector; DB-624 column: trade name, a product of J&W Inc.) to know the change of the TCE concentration with time in the bottle. The gas phase TCE concentration was converted to the total amount of TCE in the bottle. The obtained results are shown in FIG. 3.

As a result, approx. 3.99 g of TCE were decomposed within 80 minutes without discharging TCE-contaminated water or gas.

Comparative Example 1

An experiment was carried out in the same manner as in Example 1, except that decomposition was carried out with constant light irradiation until TCE was completely decomposed. As a result, about 1 g of TCE was decomposed within 80 minutes.

EXAMPLE 2
Continuous Decomposition Treatment of TCE-Contaminated Gas with Functional Electrolyzed Water TCE in gas was decomposed by using a decomposition apparatus shown in FIG. 1.

First, function water having a pH value of 2.6, an oxidation-reduction potential of 1,000 mV and a residual chlorine concentration of 75 mg/l was prepared by using a strongly acidic functional water generating apparatus 12 as in Example 1. Then, 300 ml of functional water were fed into a decomposition vessel 13 (a glass tube of 100 cm in height and 3 cm in inner diameter) with a pump of a functional water supplying means 12. At this point, the water level was about 40 cm.

Then, two black light fluorescent lamps (10 W, trade name: FL10BLB, a product of Toshiba) were set in tandem along the glass tube, and the tube was irradiated with light intensity of 0.1 to 0.4 mW/cm$^2$.

The gas discharged from the decomposition vessel 13 was introduced into an adsorption unit 16. The adsorption unit 16 was a glass column 30 cm long and 3 cm in inner diameter containing 10 g of granular activated carbon (a product of Kanto Kagaku K.K.), and through which the gas was discharged outside. The column was wound with a heating means 17 comprised of a heating mantle having a fastener for pipe heating and a thermosensor for preventing overheating. The heating means 17 was set to keep the temperature of the activated carbon at about 95° C. on switching on.

By using a permeator (PB-1B, a product of Gastec) as a polluted gas supplying means 10, air containing TCE at 10.4 ppm by volume was blown into the functional electrolyzed water in the decomposition vessel 13 through a bubbler 15 at a rate of 50 ml/min.

Figure 4:
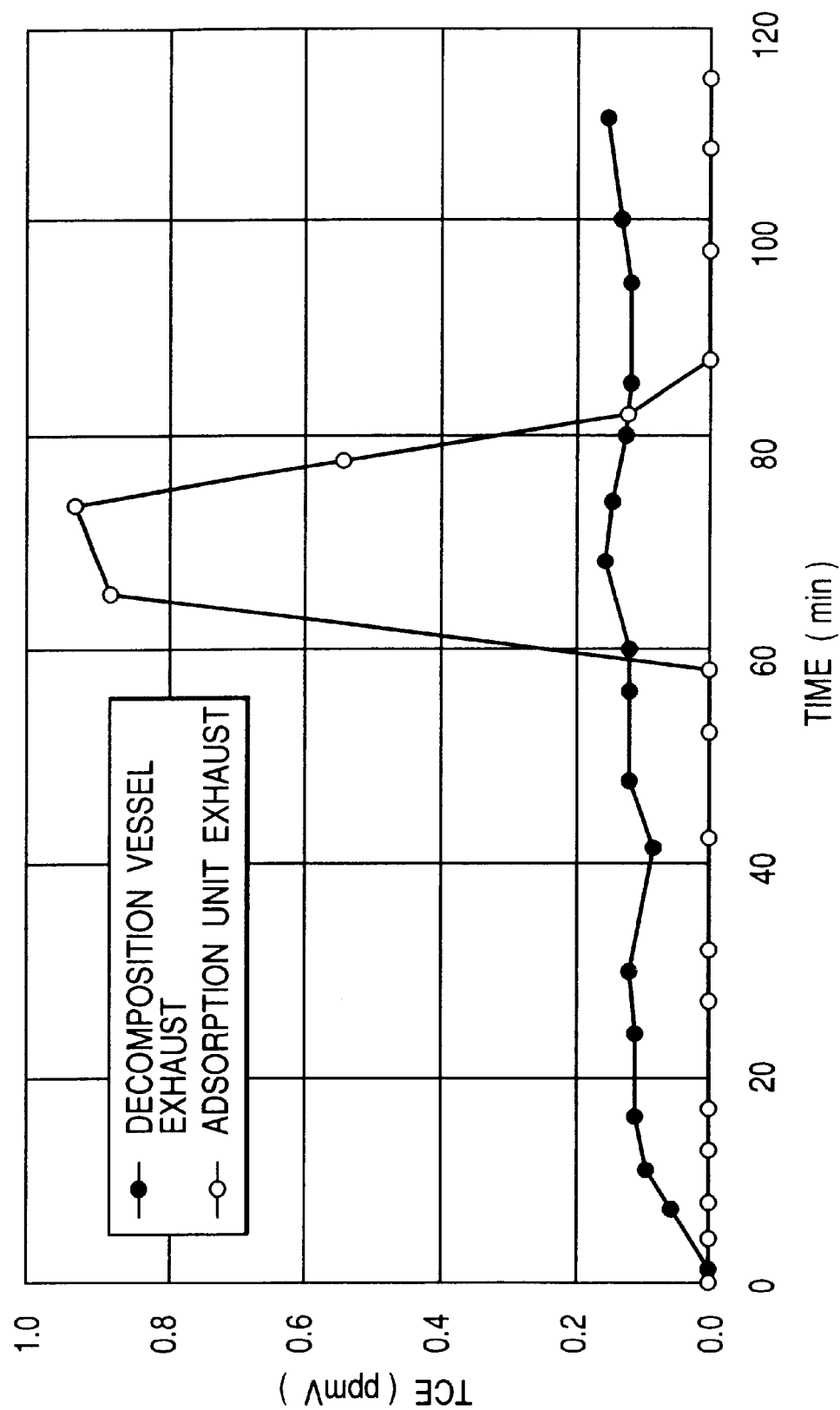
FIG. 4 is a graph showing a change of TCE concentration determined at regular intervals during continuous decomposition treatment of TCE-contaminated gas in Example 2, where adsorption by activated carbon and release from it were also carried out.

TCE concentration in the gas discharged from the decomposition vessel 13 and from the adsorption unit 16 was periodically determined. Gas was sampled by using a gastight syringe from a sampling port provided at a position between a diverter valve 18(A) and the adsorption unit 16 in a teflon tube connecting the adsorption unit 16 and the decomposition vessel 13. The gas samples were subjected to gas chromatography (GC-14B with an FID detector: a product of Shimadzu Seisakusho; DB-624 column: trade name, a product of J&W). The result is shown in FIG. 4.

As a result, although TCE was decomposed in the decomposition vessel 13, the TCE level in the gas discharged from the vessel was below the detection limit (about 0.05 ppm (vol.)) for only about 5 minutes. After that, the level rose to about 0.1 ppm (vol.). On the other hand, the TCE concentration in the gas discharged from the adsorption unit was below the detection limit for 60 minutes from the start.

60 minutes after the start of the experiment, the diverter valve 18(A) was switched to send the gas from the adsorption unit 16 back to a compressor, which was sending air to the permeator, while the generation of TCE-containing gas from the permeator was continued. At the same time, the electric source of the heating mantle wound around the column was switched on.

As a result, gas containing as much as 1 ppm of TCE was discharged from the column for about 20 minutes, and the gas was fed back to the decomposition vessel 13 for decomposition via the diverter valves 18(A,B) and the polluted gas supplying means 10. After 30 minutes of release, the TCE concentration in the gas discharged from the adsorption unit 16 fell to 0.1 ppm (vol.), indicating that almost all of the adsorbed TCE was released from the activated carbon. Then, the heating mantle was switched off, and 10 minutes later, when the TCE concentration in the gas from the adsorption unit became lower than the detection limit, the diverter valve 18(A) was switched to discharge the gas from the column to the outside.

Thus, if an adsorption unit is attached to the decomposition vessel downstream, and a process of decomposition-adsorption for a certain period followed by release-feed back-decomposition for a certain period is repeated, it is possible to achieve continuous decomposition of TCE while maintaining the TCE level in the exhaust gas lower than the detection limit. On the other hand, when only a decomposition vessel is used, the TCE concentration in the discharge gas will rise over the detection limit within 5 minutes.

Comparative Example 2

In this Example, the pump 11 and the inlet of the adsorption unit 16 of FIG. 1 are connected to directly introduce the TCE-containing gas generated from the permeator into the adsorption unit.

As a result, within 40 minutes, the TCE concentration in the discharge gas from the adsorption unit 16 became about 0.01 ppm, indicating that a leak from the activated carbon occurred.

EXAMPLE 3
Continuous Decomposition Treatment of TCE-contaminated Gas in a Decomposition Vessel Having Electrodes Therein The functional water supplying means 12 was removed from the apparatus shown in FIG. 1 and used in Example 1, and a pair of platinum plates (4 cm×1 cm) were provided at the bottom part of the decomposition vessel 13 at an interval of 1 cm (not shown). Both plates were wired to an electric source, and about 300 ml of saline (1000 mg/l) were fed to the vessel 13.

By using the above apparatus, a similar experiment was carried out to that in Example 2, that is, the black light fluorescent lamps were turned on, TCE-containing air was supplied from the permeator, and at the same time, the electric source was turned on to apply a voltage to the electrodes. The voltage was about 30 V when the current was adjusted to 2 A, which was the uppermost supply of the apparatus.

The same result as in Example 2 was obtained, showing that not only the functional water produced by the functional water generating apparatus, but also the functional water produced in situ in a decomposition vessel provided with a pair of electrodes therein, enables the continuous decomposition of TCE while maintaining the TCE level in the exhaust gas lower than the detection limit when the process of decomposition-adsorption followed by release-feedback was repeated.

EXAMPLE 4
Continuous Decomposition Treatment of TCE-Contaminated Gas with Synthetic Functional Water The functional electrolyzed water generating apparatus in Example 2 (the supplying means 12 in FIG. 1) was replaced with a 1 liter glass bottle and a pump. Separately, various aqueous solutions were prepared to contain 0.001 to 0.1 mol/l (calculated from 0.001 to 0.1 N) of HCl, 0.005 to 0.02 mol/l (calculated from 0.005 to 0.02 N) of NaCl, and 0.0001 to 0.01 mol/l of sodium hypochlorite. The pH, oxidation-reduction potential and residual chlorine concentration of these solutions varied within 1.0 to 4.0, 800 to 1,500 mV and 5 to 150 mg/l, respectively. Thus, in this Example, a solution containing 0.006 N HCl, 0.014 N NaCl, 0.002 mol/l hypochlorite was prepared, of which the pH was 2.3, the oxidation-reduction potential was 1,180 mV and the residual chlorine concentration was 105 mg/l. About 300 ml of this solution prepared in the glass bottle were fed to the decomposition vessel 13 by a pump.

By using this apparatus, the decomposition experiment was carried out in the same manner as in Example 2.

Almost the same result as in Example 2 was obtained, showing that not only the functional water produced by the functional water generating apparatus, but also synthetic functional water filled in the decomposition vessel enables the continuous decomposition of TCE while maintaining the TCE level in the exhaust gas lower than the detection limit, when the process of decomposition-adsorption followed by release-feedback was repeated.

EXAMPLE 5
Continuous Decomposition Treatment of TCE-Contaminated Water with Functional Electrolyzed Water Continuous decomposition of TCE was carried out with functional electrolyzed water by using the decomposition apparatus shown in FIG. 2. First, functional water having a pH value of 2.6, an oxidation-reduction potential of 1,000 mV and a residual chlorine concentration of 75 mg/l was prepared by using a strongly acidic functional water generating apparatus 22 as in Example 2. Then, functional water was fed to a decomposition vessel 23 (a glass tube of 100 cm in height and 3 cm in inner diameter) by a pump at a rate of 10 ml/min where the outlet port was controlled to maintain a water level of about 40 cm.

As in Example 2, two black light fluorescent lamps were set along the glass tube to irradiate it. The discharged water from the decomposition vessel 23 was led to a glass column to pass through it. The column contained 10 g of granular activated carbon and a heating mantle and a thermosensor were wound around the column.

Next, a TCE solution in distilled water (10 mg/l) was fed to the polluted water supplying means 20, and further fed to the decomposition vessel 23 at a rate of 10 ml/min by a pump. The TCE concentration in the discharges from the decomposition vessel 23 and from the adsorption unit 26 were determined at regular intervals.

Figure 5:
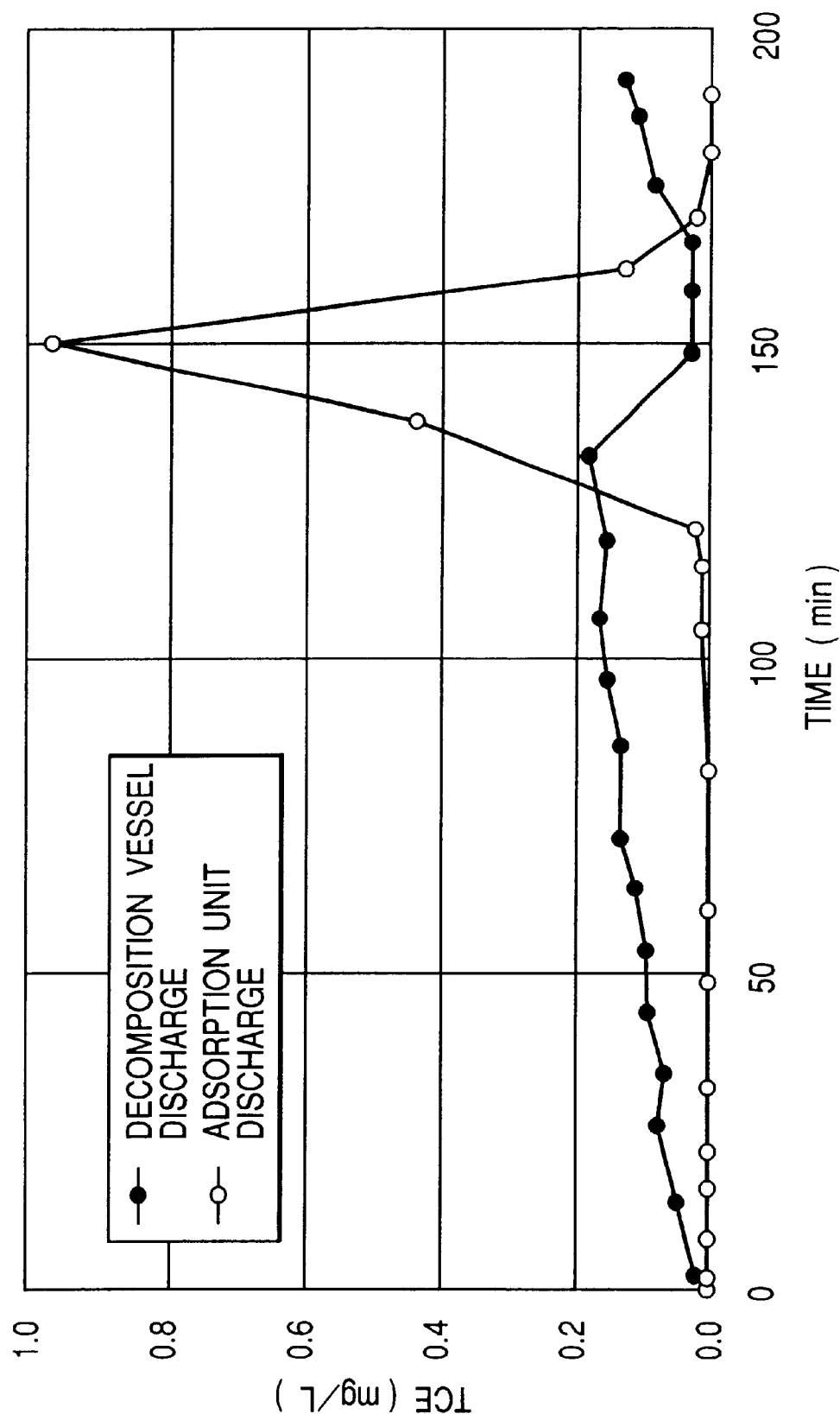
FIG. 5 is a graph showing a TCE concentration change determined at regular intervals during continuous decomposition treatment of TCE-contaminated water in Example 5, where the adsorption by activated carbon and release from it were carried out together.

The determination of the TCE concentration in the liquid was carried out as follows. 10 ml of the liquid was sampled by using a gas-tight syringe from two sampling ports, one provided on the teflon tube connecting a diverter valve 28(A) and the adsorption unit 26 and the other on a teflon tube connecting the decomposition vessel 23 and the adsorption unit 26. Each sample was put in a 27 ml vial and tightly sealed with a teflon-lined butyl rubber stopper and incubated at 23.5° C. for 30 minutes. The gas phase in the vial was subjected to gas chromatography (GC-14B with an FID detector: a product of Shimadzu Seisakusho; DB-624 column: trade name, a product of J&W). The converted result is shown in FIG. 5.

Although TCE was decomposed in the decomposition vessel, the TCE level in the liquid discharged from the vessel was lower than the discharge quality standard (0.03 mg/l) only during the first 5 minutes. After that the level rose to about 0.05 mg/l. On the other hand, the TCE concentration of the liquid discharged from the adsorption unit was constantly lower than the discharge quality standard for 120 minutes.

120 minutes after the start of the experiment, the diverter valves 28(A,B) were switched to send the liquid from the adsorption unit 26 back to the decomposition vessel 23 by a pump 21 through a nozzle 25. At the same time, the electric source of the heating mantle winding around the column was switched on.

As a result, a liquid containing as much as 1 mg/l TCE was discharged from the adsorption column for about 30 minutes, and the liquid was fed back to the decomposition vessel 23 for decomposition. When the TCE concentration in the liquid discharged from the adsorption unit 26 fell to 0.1 mg/l after 40 minutes of release, it was considered that almost all of the adsorbed TCE was released from the activated carbon, and the heating mantle was switched off. Ten minutes later, when the TCE concentration in the liquid from the adsorption unit became 0.03 mg/l or less, the diverter valves 28(A,B) were switched to discharge water from the adsorption unit and to supply the polluted water from the supplying unit 20 to the decomposition vessel 23.

The experimental results are as follows: when only a decomposition vessel is used, the TCE concentration in the discharge will rise over the discharge quality standard within 5 minutes. However, if an adsorption unit is added to the decomposition vessel downstream, and a process of decomposition-adsorption for a certain period followed by release-feedback-decomposition for a certain period is repeated, it is possible to achieve continuous decomposition of TCE while maintaining the TCE level of the discharge lower than the discharge standard.

EXAMPLE 6
Continuous Decomposition of TCE in Water in a Decomposition Vessel Provided with Electrodes To the apparatus shown in FIG. 5, a pair of platinum plates (4 cm×1 cm) were provided at the bottom part of the decomposition vessel 23 at an interval of 1 cm (not shown). Each plate was wired to an electric source, and about 1000 ml of saline of 1000 mg/l were fed to the vessel 23 by using the functional water supplying means 22.

By using the above apparatus, a similar experiment was carried out to that in Example 5, that is, the black light fluorescent lamps were turned on, TCE-containing water was supplied to the vessel 23, and at the same time, the electric source was turned on to apply a voltage to the platinum electrodes. The voltage was about 30 V when the current was adjusted to 2 A, which was the upper limit supply of the apparatus.

The same result as in Example 5 was obtained, showing that not only the functional water produced by the functional water generating apparatus, but also the functional water produced in a decomposition vessel provided with a pair of electrodes therein, enables the continuous decomposition of TCE while maintaining the TCE level of the discharge lower than the discharge quality standard by repeating the process of decomposition-adsorption followed by release-feedback.

EXAMPLE 7
Continuous Decomposition of TCE in Water with Synthetic Functional Water In the decomposition apparatus shown in FIG. 2, a one liter glass bottle and a pump were used as the functional water supplying means 22 instead of the functional electrolyzed water generating apparatus used in Example 5. Separately, as in Example 4, a solution containing 0.006 mol/l (calculated from 0.006 N) HCl, 0.014 mol/l (calculated from 0.014 N) NaCl, 0.002 mol/l hypochlorite was prepared, which had a pH of 2.3, the oxidation-reduction potential of 1180 mV and the residual chlorine concentration of 105 mg/l. The functional water was fed to the decomposition vessel 23 by a pump at a rate of 10 ml/min.

By using this apparatus, the decomposition experiment was carried out in the same manner as in Example 5.

Almost the same result as in Example 5 was obtained, showing that not only the functional water produced by the functional water generating apparatus, but also synthetic functional water filled in the decomposition vessel enables the continuous decomposition of TCE while maintaining the TCE level of the discharged water lower than the discharge quality standard by repeating the process of decomposition-adsorption followed by release-feedback.

EXAMPLE 8
Batch Decomposition of TCE in Gas Using Zeolite as Adsorbent

A decomposition experiment was carried out for 5 hours by using the same apparatus as in Example 2, except that the heating means 17 of the decomposition apparatus shown in FIG. 1 was removed and the activated carbon in the adsorption unit was replaced with 10 g of a particular zeolite (commercial name: Rainbow Sand, a product of Sanko Kogyo K.K.). During the decomposition experiment, the TCE concentration in the exhaust gas from the adsorption unit 16 was constantly under the detection limit. On the other hand, the TCE concentration of the exhaust gas from the decomposition vessel 13 was about 0.1 ppm for the first two hours, but gradually increased after that, and after 5 hours, at the end of the experiment, it was as high as about 10 ppm (vol.), suggesting the inactivation of the functional water.

At this point, the valve of the permeator was shut off, the pump 11 was turn off to stop the supply of TCE containing air, the black light fluorescent lamps were switched off, and the decomposition was finished. After that, the adsorption unit 16 was removed from the apparatus and one end of which was closed and the other end was connected to a suction pump. TCE adsorbed by the zeolite was released by suction and cooled to about 0° C. in a cooling pipe and recovered as liquid TCE. The recovered liquid TCE was about 0.1 $\mu$l. The recovered TCE was returned to the permeator and the adsorption unit 16 was attached to the apparatus, and the functional water in the decomposition vessel 13 was changed with fresh functional water. Then, the TCE decomposition was started again by opening the valve of the permeator, starting the pump 11, and switching on the fluorescent lamps.

During a subsequent 5 hour-run, TCE was not detected in the exhaust from the adsorption unit, showing that the TCE recovered from zeolite was decomposed without a problem, and trace TCE not decomposed was adsorbed by the adsorption unit containing zeolite.

EXAMPLE 9
Batch Decomposition of Liquid TCE with Functional Electrolyzed Water

Batchwise decomposition of liquid TCE was carried out with functional electrolyzed water by using the decomposition apparatus shown in FIG. 6. First, functional water having a pH value of 2.6, an oxidation-reduction potential of 1,000 mV and a residual chlorine concentration of 75 mg/l was prepared by using a strongly acidic functional water generating apparatus 32 as in Example 2. Then, functional water was fed to a decomposition vessel 33 (a glass tube 100 cm in height and having an inner diameter of 3 cm) to obtain a water level of about 40 cm.

The apparatus is constructed so that the decomposition vessel 33 is airtight unless one of the top and bottom valves is opened, and the gas in the upper space of the vessel is circulated by a gas circulating pump 31 via the gas diverter valve 38, gas circulation pipe 39 and bubbler 35 to the bottom of the vessel, whereby the gas and functional water in the vessel were aerated and stirred under airtight conditions.

In this Example, adsorption of TCE was carried out as follows: the gas diverter valves 38(A,B) were switched to make the gas from the decomposition vessel flow through the adsorption unit. The adsorption unit was comprised of a glass tube containing granular activated carbon, a heating mantle and a thermosensor, as in Example 2. TCE in the gas was absorbed by the activated carbon in the adsorption unit and the gas flowed through the circulation pipe 39 via the diverter valve 38(B).

First, 490 $\mu$l of liquid TCE (approx. 700 mg) was introduced from the supplying port 30 into the decomposition vessel 33, blacklight fluorescent lamps set beside the vessel 33 as in Example 2 were switched on for irradiation, and the valves 38(A,B) were switched to shut the gas from the unit 36, and decomposition was carried out operating the gas circulation pump 31 to circulate the gas and stir the contents of the decomposition vessel 33.

Although TCE was decomposed in the decomposition vessel, the residual TCE in the decomposition vessel was about 1/200 of the initial concentration after 20 minutes of decomposition, and the TCE level in the exhaust gas from the decomposition vessel was higher than the discharge quality standard of 0.03 mg/l. After decomposition of 20 minutes, the diverter valves 38(A,B) were switched to aerate the content in the decomposition vessel 33, and residual TCE in the vessel 33 was expelled to be adsorbed by the activated carbon in the adsorption unit 36. When the TCE concentration of the liquid in the decomposition vessel 33 became 0.03 mg/l or lower, the diverter valves 38(A,B) were switched back, and the top and bottom valves of the decomposition vessel were opened to drain. Then, the functional water and liquid TCE were fed again to the decomposition vessel 33 to repeat the decomposition process. This process was repeated a total of 10 times.

Figure 7:
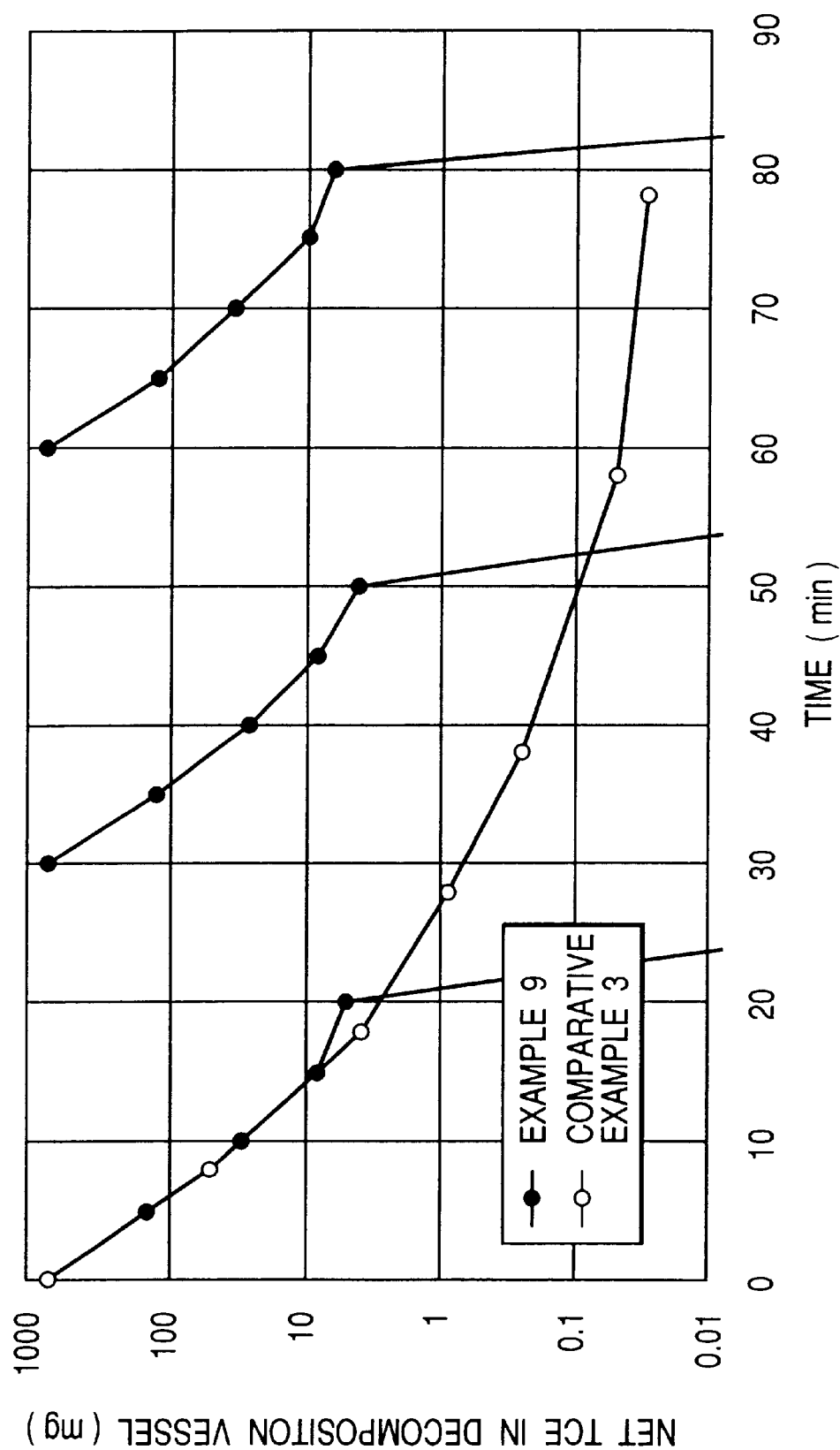
FIG. 7 is a graph showing a change of TCE concentration in the decomposition vessel of Example 9 and Comparative Example 3, determined at regular intervals. In Example 9, decomposition and adsorption treatments were intermittently repeated with replenishment of the target substance. In Comparative Example 3, decomposition was continued without replenishment.

Gaseous TCE concentration in the decomposition vessel was determined as follows. Gas was sampled by using a gas-tight syringe from a sampling port provided at the middle of a teflon tube connecting the diverter valve 38A and the decomposition vessel 33, and subjected to the determination as in Example 5. FIG. 7 shows the change of the total TCE amount in the decomposition vessel from the start to 60 minutes calculated from the determined results.

After 100 cycles of the batchwise TCE decomposition, the black light lamps 34 were switched off, and the liquid in the decomposition vessel was drained. Then, the decomposition vessel 33 was filled with fresh functional water and the electric source of the pump 31 and the power source of the heating mantle 36 were switched on to regenerate the activated carbon in the adsorption unit. After 30 minutes of regeneration, total amount of TCE in the decomposition vessel calculated from the TCE concentration in the gas and liquid phases was about 500 mg, which indicated the release of the entire amount of TCE adsorbed by the activated carbon. At this point, electric sources of the pump 31 and heating mantle 37 were switched off, and the black light fluorescent lamps were switched on for 20 minutes. At this point, the TCE concentration in the decomposition vessel was about 5 mg. Then, the pump 31 was operated for 5 minutes to aerate the liquid in the vessel 33, and the content was drained from the bottom valve after confirming that the TCE concentration became under the discharge quality standard.

The experimental results show that when only a decomposition vessel is used, TCE is not completely decomposed within 20 minutes and the liquid and gas in the decomposition vessel cannot be discharged directly from the vessel. However, if an adsorption unit is added downstream of the decomposition vessel, and a process of decomposition-adsorption for a certain period followed by release-feedback-decomposition for a certain period is repeated, it is possible to decompose about 70 g of TCE within 50.5 hours without discharging TCE-contaminated waste. It was also shown that the activated carbon can be regenerated.

Comparative Example 3

A decomposition experiment was carried out in the same manner as in Example 7, except that TCE decomposition was carried out for 80 minutes under continuous irradiation without replenishing TCE-contaminated water. The result is shown in FIG. 7.

As a result, not all of the charged TCE can be decomposed within 80 minutes.

EXAMPLE 10

Batch Decomposition of liquid TCE in Decomposition Vessel Provided with Electrodes To the apparatus shown in FIG. 6, a pair of platinum plates (4 cm×1 cm) were added at the bottom part of the decomposition vessel 33 at an interval of 1 cm (not shown). Both plates were wired to an electric source, and about 1000 ml of saline of 1000 mg/l were fed to the vessel 33 by using the functional water supplying means 32.

By using the above apparatus, 490 µl of liquid TCE were supplied to the vessel 33 as in Example 9, and at the same time, the black light fluorescent lamps 34 and the circulation pump 31 were turned on, and the electric source was turned on to apply a voltage to the platinum electrodes. The voltage was about 30 V when the current was adjusted to 2 A, which was the uppermost supply of the apparatus.

Almost the same result as in Example 9 was obtained, showing that not only the functional water produced by the functional water generating apparatus, but also the functional water produced in a decomposition vessel provided with a pair of electrodes therein, enables the continuous decomposition of TCE without discharging TCE-contaminated water by repeating the process of decomposition-adsorption followed by release-feedback. It was also shown that the activated carbon can be regenerated.

EXAMPLE 11

Batch Decomposition of Liquid TCE with Synthetic Functional Water

In the decomposition apparatus shown in FIG. 6, a 5 l glass bottle and a pump were used as the functional water supplying means 32 instead of the functional electrolyzed water generating apparatus used in Example 9. Separately, as in Example 4, a solution containing 0.006 mol/l (calculated from 0.006 N) HCl, 0.014 mol/l (calculated from 0.014 N) NaCl, 0.002 mol/l hypochlorite was prepared, which had the pH of 2.3, the oxidation-reduction potential of 1180 mV and the residual chlorine concentration of 105 mg/l. The functional water was placed in the glass bottle and fed to the decomposition vessel 33 by a pump. At the end of every 30 min cycle, the content of the vessel 33 was drained and fresh functional water was supplied by the pump to a water level of 40 cm in the vessel 33.

By using this apparatus, the decomposition experiment was carried out in the same manner as in Example 9, turning on the black light fluorescent lamps 34 and the circulation pump 31.

Almost the same result as in Example 9 was obtained, showing that not only the functional water produced by the functional water generating apparatus, but also synthetic functional water filled in the decomposition vessel, enables the decomposition of TCE without discharging TCE-contaminated water, by repeating the process of decomposition-adsorption followed by release-feedback. It was also shown that the activated carbon can be regenerated.

EXAMPLE 12

Batch Treatment of TCE-Contaminated Water with Functional Electrolyzed Water

Batchwise decomposition treatment of TCE-contaminated water was carried out with functional electrolyzed water by using the decomposition apparatus shown in FIG. 6. First, functional water having a pH value of 2.6, an oxidation-reduction potential of 1,000 mV and a residual chlorine concentration of 75 mg/l was prepared by using a strongly acidic functional water generating apparatus 32 as in Example 2. Then, functional water was fed by a pump to a decomposition vessel 33 (a glass tube of 100 cm in height and 3 cm in inner diameter) to a water level of about 20 cm.

Next, a TCE solution (1000 mg/l) was introduced from the supplying port 30 into the decomposition vessel 33 to a water level of 40 cm, and the valve was closed. Then, black light fluorescent lamps were switched on for irradiation, and the gas circulation pump 31 was operated to decompose TCE in a cycle of 30 minutes as in Example 9. As a result, it was shown that by repeating a process of decomposition-adsorption followed by release-feedback, it is possible to decompose TCE without discharging TCE-contaminated water outside, using a decomposition vessel containing a mixture of TCE-contaminated water and functional electrolyzed water. It was also shown that the activated carbon can be regenerated.

EXAMPLE 13
Batch Treatment of TCE-Contaminated Water by Using Decomposition Vessel Provided with Electrodes To the apparatus shown in FIG. 6, a pair of platinum plates (4 cm×1 cm) were added at the bottom part of the decomposition vessel 33 at an interval of 1 cm (not shown). Both plates were wired to an electric source.

By using the above apparatus, a TCE solution (1000 mg/l) was introduced into the decomposition vessel 33 to a water level of 40 cm, and powdery NaCl was added to a concentration of 1000 mg/l, and the valve was closed. Then, blacklight fluorescent lamps were switched on for irradiation, and the gas circulation pump 31 was operated, and at the same time, the electric source was turned on to apply a voltage to the platinum electrodes. Thus, TCE decomposition was carried out in a cycle of 30 minutes as in Example 9. The voltage was about 30 V when the current was adjusted to 2 A, which was the uppermost supply of the apparatus.

As a result, it was shown that by repeating the process of decomposition-adsorption followed by release-feedback, it is possible to decompose TCE without discharging TCE-contaminated water, not using the functional water produced by the functional water generating apparatus, but using a decomposition vessel provided with a pair of electrodes in it to generate functional water in situ. It was also shown that the activated carbon can be regenerated.

EXAMPLE 14
Batch Treatment of TCE-Contaminated Water with Synthetic Functional Water By using the apparatus shown in FIG. 6, a TCE solution (1000 mg/l) was introduced into the decomposition vessel 33 to a water level of 40 cm, and then, hydrochloric acid, sodium chloride and sodium hypochlorite were added to obtain a solution containing 0.006 mol/l (calculated from 0.006 N) HCl, 0.014 mol/l (calculated from 0.014 N) NaCl, 0.002 mol/l hypochlorite, and the valve was closed. Then, black light fluorescent lamps were switched on for irradiation, and the gas circulation pump 31 was operated. Thus, TCE decomposition was carried out in a cycle of 30 minutes as in Example 9.

As a result, it was shown that it is possible to decompose TCE-contaminated water without discharging TCE-contaminated water outside by repeating a process of decomposition-adsorption followed by release-feedback, without using functional water produced by the functional water generating apparatus by supplying the contaminated water with sodium hypochlorite, NaCl, etc. each time to make it equal to functional water. It was also shown that the activated carbon can be regenerated.

What is claimed is:

1. A method of decomposing a target substance being a halogenated aliphatic hydrocarbon compound with functional water, comprising the steps of:
    contacting the target compound and an active component of the functional water for decomposition in a tightly sealed reaction chamber wherein the active component is generated in the functional water by light irradiation;
    removing the target compound remained intact in the reaction chamber;
    adsorbing the removed target by using an adsorbent;
    releasing the adsorbed target substance from the adsorbent; and
    feeding back the released target substance to the reaction chamber.

2. The method according to claim 1, wherein the target substance is contained in a gas, the remained target substance is removed by discharging the gas from the reaction chamber, and the discharged gas is brought in contact with the adsorbent.

3. The method according to claim 1, wherein the target substance is contained in a liquid, the remained target substance is removed by discharging the liquid from the reaction chamber, and the discharged liquid is brought in contact with the adsorbent.

4. The method according to claim 1, wherein each step is conducted successively.

5. The method according to claim 1, wherein the adsorbed target substance is released by heating or contacting a high temperature medium with the adsorbent or a vessel containing the adsorbent.

6. The method according to claim 1, wherein the adsorbed target substance is released by reducing the pressure of the adsorbent or a vessel containing the adsorbent.

7. The method according to claim 1 wherein the target substance is in a gaseous halogenated aliphatic hydrocarbon compound, the method comprising the steps of:
    aerating the functional water with the target substance; and
    irradiating with light the gaseous target substance and a gas generated from the functional water.

8. The method according to claim 7, wherein the gaseous target substance is introduced into the functional water through a bubbler.

9. The method according to claim 1, wherein the functional water contains a hypochlorite ion.

10. The according to claim 9, wherein the functional water is an aqueous solution of a hypochlorite.

11. The method according to claim 10, wherein the hypochlorite is at least one of sodium hypochlorite and potassium hypochlorite.

12. The method according to claim 9, wherein the functional water further contains an inorganic acid or an organic acid.

13. The method according to claim 12, wherein the inorganic acid or organic acid is selected from the group consisting of hydrochloric acid, hydrofluoric acid, sulfuric acid, phosphoric acid, boric acid, acetic acid, formic acid, malic acid, citric acid, and oxalic acid.

14. The method according to claim 1, wherein the functional water is acidic water produced around an anode when water containing an electrolyte is electrolyzed.

15. The method according to claim 14, wherein the electrolyte includes at least one of sodium chloride and potassium chloride.

16. The method according to claim 1, wherein the functional water is a mixture of acidic water produced around an anode and alkaline water produced around a cathode when water containing an electrolyte is electrolyzed.

17. The method according to claim 16, wherein the mixture is obtained by mixing the acidic water and the alkaline water to a ratio of not greater than 1:1.

18. The method according to claim 1, wherein the functional water is characterized by a hydrogen ion concentration (pH) between 1 and 4, an oxidation-reduction potential between 800 and 1,500 mV (working electrode: platinum, reference electrode: silver-silver chloride), and a chlorine concentration between 5 and 150 mg/l.

19. The method according to claim 1, wherein the functional water is characterized by a hydrogen ion concentration (pH) between 4 and 10, an oxidation-reduction potential between 300 and 1,100 mV (working electrode: platinum, reference electrode: silver-silver chloride), and a chlorine concentration between 2 and 100 mg/l.

20. The method according to claim 1, wherein the light includes light in a wavelength range between 300 and 500 nm.

21. The method according to claim 20, wherein the light includes light in a wavelength range between 350 and 450 nm.

22. The method according to claim 1, wherein an intensity of irradiation is between 10 $\mu$W/cm$^2$ and 10 mW/cm$^2$.

23. The method according to claim 22, wherein the intensity of irradiation is between 50 $\mu$W/cm$^2$ and 5 mW/cm$^2$.

24. The method according to claim 1, wherein the halogenated aliphatic hydrocarbon compound is a halogenated aliphatic hydrocarbon compound substituted with chlorine.

25. The method according to claim 24, wherein the halogenated aliphatic hydrocarbon compound is at least one of:

trichloromethane, dichloromethane, 1,1,1-trichloroethane, chloroethylene, 1,1-dichloroethylene, cis-1,2-dichloroethylene, trans-1,2-dichloroethylene, trichloroethylene and tetrachloroethylene.

26. The method according to claim 1, wherein the adsorbent is a solid material having a porous surface.

27. The method according to claim 26, wherein the porous adsorbent is selected from the group consisting of activated carbon, activated carbon fiber, silica gel, zeolite, porous metals, and activated clay.

28. An apparatus for decomposing a halogenated aliphatic hydrocarbon compound comprising:

a reaction chamber in a tightly sealed state;

means to supply a target substance being a halogenated aliphatic hydrocarbon compound to the reaction chamber;

means to supply a functional water to the reaction chamber;

means for irradiating light to generate an active component for decomposition in the functional water;

means for removing the target substance remained intact in the reaction chamber from the reaction chamber;

means for adsorbing the removed target substance with an adsorbent; and means for releasing the adsorbed target material from the adsorbent; and means for feeding back the released target substance to the reaction chamber.

29. The apparatus according to claim 28, wherein the target substance is contained in a gas, the means for removing the remained target substance is discharging means from the reaction chamber, and the means for adsorbing the discharged gas with the adsorbent is means for bringing the discharge in contact with the adsorbent.

30. The apparatus according to claim 28, wherein the target substance is contained in a liquid, the means for removing the remained target substance is discharging means from the reaction chamber, and the means for adsorbing the discharged liquid with the adsorbent is means for bringing the discharge in contact with the adsorbent.

31. The apparatus according to claim 28, wherein means for releasing the adsorbed target substance is means for heating the adsorbent or a vessel containing the adsorbent, or a means for contacting a high temperature medium with the adsorbent or a vessel containing the adsorbent.

32. The apparatus according to claim 28, wherein the means for releasing the adsorbed target substance is means for reducing the pressure of the adsorbent or a vessel containing the adsorbent.

33. The apparatus according to claim 28, wherein the target substance is a gaseous halogenated aliphatic hydrocarbon compound, and the apparatus further comprises:

means to aerate the functional water with the gaseous target substance; and means to irradiate light to the gaseous target substance and a gas generated from the functional water.

34. The apparatus according to claim 33, wherein the means to aerate the functional water with the gaseous target substance contains a bubbler.

35. The apparatus according to claim 28, wherein the functional water contains a hypochlorite ion.

36. The apparatus according to claim 35, wherein the functional water is an aqueous solution of a hypochlorite.

37. The apparatus according to claim 36, wherein the hypochlorite is at least one of sodium hypochlorite and potassium hypochlorite.

38. The apparatus according to claim 35, wherein the functional water further contains an inorganic acid or an organic acid.

39. The apparatus according to claim 38, wherein the inorganic acid or organic acid is selected from the group consisting of hydrochloric acid, hydrofluoric acid, sulfuric acid, phosphoric acid, boric acid, acetic acid, formic acid, malic acid, citric acid, and oxalic acid.

40. The apparatus according to claim 28, wherein the functional water is acidic water produced around an anode when water containing an electrolyte is electrolyzed.

41. The apparatus according to claim 40, wherein the electrolyte includes at least one of sodium chloride and potassium chloride.

42. The apparatus according to claim 28, wherein the functional water is a mixture of acidic water produced around an anode and alkaline water produced around a cathode when water containing an electrolyte is electrolyzed.

43. The apparatus according to claim 42, wherein the mixture is obtained by mixing the acidic water and the alkaline water to a ratio of not greater than 1:1.

44. The apparatus according to claim 28, wherein the light includes light in a wavelength range between 300 and 500 nm.

45. The apparatus according to claim 44, wherein the light includes light in a wavelength range between 350 and 450 nm.

46. The apparatus according to claim 28, wherein an intensity of irradiation is between 10 $\mu$W/cm$^2$ and 10 mW/cm$^2$.

47. The apparatus according to claim 46, wherein the intensity of irradiation is between 50 $\mu$W/cm$^2$ and 5 mW/cm$^2$.

48. The apparatus according to claim 28, wherein the adsorbent is a solid material having a porous surface.

49. The apparatus according to claim 48, wherein the porous adsorbent is selected from the group consisting of activated carbon, activated carbon fiber, silica gel, zeolite, porous metals, and activated clay.

50. The apparatus according to claim 28, wherein the functional water is characterized by a hydrogen ion concentration (pH) between 1 and 4, an oxidation-reduction potential between 800 and 1,500 mV (working electrode: platinum, reference electrode: silver-silver chloride), and a chlorine concentration between 5 and 150 mg/l.

51. The apparatus according to claim 28, wherein the functional water is characterized by a hydrogen ion concentration (pH) between 4 and 10, an oxidation-reduction potential between 300 and 1,100 mV (working electrode: platinum, reference electrode: silver-silver chloride), and a chlorine concentration between 2 and 100 mg/l.

52. A method for decomposing a target substance being a halogenated aliphatic hydrocarbon compound comprising the steps of:

decomposing the target substance by contacting the target substance and an active component for decomposing the target substance in a reaction chamber;

stopping the decomposition step while a part of the target substance remains undecomposed in the reaction chamber;

removing the target substance remained intact in the reaction chamber;

concentrating the target substance; and feeding back the target substance into the reaction chamber.

53. An apparatus for decomposing a target substance being a halogenated aliphatic hydrocarbon compound comprising:

a reaction chamber for decomposition of the target substance;

a supplying conduit for supplying the target substance into the reaction chamber;

an evacuation conduit for removing the target substance remained intact in the reaction chamber;

an adsorption unit for concentrating the target substance delivered by the evacuation conduit, said adorption unit being in fluid communication with the reaction chamber or the supplying conduit to feed back the target substance into the reaction chamber, wherein the the decomposition of the target substance is stopped while a part of the target substance remains undecomposed in the reaction chamber, and the undecomposed target substance is removed from the reaction chamber through said evacuation conduit.

54. A method for decomposing a target substance being a halogenated aliphatic hydrocarbon compound comprising the steps of:

decomposing the target substance by contacting the target substance and an active component for decomposing the target substance in a reaction chamber;

stopping the decomposition step while a part of the target substance remains undecomposed in the reaction chamber;

exhausting a gas containing the undecomposed target substance and a decomposed target substance from the reaction chamber;

extracting the undecomposed target substance from the gas; and feeding back the extracted undecomposed target substance into the reaction chamber.

55. An apparatus for decomposing a target substance being a halogenated aliphatic hydrocarbon compound comprising:

a reaction chamber for decomposition of the target substance;

a supplying conduit for supplying the target substance into the reaction chamber;

an exhaustion conduit for exhausting a gas containing an undecomposed target substance and a decomposed target substance from the reaction chamber; and an extractor that extracts the undecomposed target substance from the gas exhausted by the exhaustion conduit, wherein said extractor is in fluid communication with the reaction chamber to feed back the extracted undecomposed target substance into the reaction chamber;

wherein the decomposition of the target substance is stopped while a part of the target substance remains undecomposed in the reaction chamber, and the undecomposed target substance is removed from the reaction chamber through said evacuation conduit.

56. A method for decomposing a target substance being a halogenated aliphatic hydrocarbon compound comprising the steps of:

decomposing the target substance by contacting the target substance and an active component for decomposing the target substance in a reaction chamber;

stopping the decomposition step while a part of the target substance remains undecomposed in the reaction chamber;

exhausting a gas containing the undecomposed target substance and a decomposed target substance from the reaction chamber;

introducing the target substance into the reaction chamber; and repeating the decomposition step through the introduction step.

* * * * *

UNITED STATES PATENT AND TRADEMARK OFFICE
CERTIFICATE OF CORRECTION

PATENT NO. : 6,462,250 B1
DATED : October 8, 2002
INVENTOR(S) : Akira Kuriyama et al.

It is certified that error appears in the above-identified patent and that said Letters Patent is hereby corrected as shown below:

Title page,
Item [56], References Cited, FOREIGN PATENT DOCUMENTS, "5-290  1/1983" should read -- 5-290  1/1993 --; and "5-292  1/1983" should read -- 5-292  1/1993 --; and "6-261590  12/1985" should read -- 60-261590  12/1985 --.

Column 1,
Line 22, "hydrocarbon, com-" should read -- hydrocarbon com- --; and
Line 23, "pounds" should read -- pounds, --.

Column 5,
Line 22, "be also" should read -- also be --;
Line 28, "0:01 mol/l" should read -- 0.01 mol/l --;
Line 37, "contain" should read -- contains --; and
Line 40, "of" should read -- of a --.

Column 10,
Line 61, "of by" should read -- of --.

Column 15,
Line 66, "turn" should read -- turned --.

Column 20,
Line 34, "The according" should read -- The method according --.

Column 21,
Line 45, "and" should be deleted.

Column 23,
Line 30, "chamber;" should read -- chamber; and --.

UNITED STATES PATENT AND TRADEMARK OFFICE
CERTIFICATE OF CORRECTION

PATENT NO.   : 6,462,250 B1
DATED        : October 8, 2002
INVENTOR(S)  : Akira Kuriyama et al.

It is certified that error appears in the above-identified patent and that said Letters Patent is hereby corrected as shown below:

<u>Column 24,</u>
Line 25, "chamber;" should read -- chamber, --.

Signed and Sealed this

Seventeenth Day of June, 2003

JAMES E. ROGAN
*Director of the United States Patent and Trademark Office*